United States Patent Office 3,419,349
Patented Dec. 31, 1968

3,419,349
PROCESS FOR THE MANUFACTURE OF CATENARILY CONDENSED AMMONIUM-PHOSPHATES AND AMMONIUM-METAL-PHOSPHATES
Hans Adolf Rohlfs and Heinz Schmidt, Wiesbaden-Biebrich, Germany, assignors to Chemische Werke Albert, Wiesbaden-Biebrich, Germany, a corporation of Germany
No Drawing. Filed Jan. 15, 1965, Ser. No. 425,944
33 Claims. (Cl. 23—107)

ABSTRACT OF THE DISCLOSURE

This invention relates to a thermal process for the production of a certain class of definite and determinable polyphosphates, namely, catenarily condensed ammonium- or ammonium-metal polyphosphates. The reaction most advantageously takes place at temperatures between 110 and 450° C. and in conformity with one aspect of the invention, between two types of reactants, namely, (A) and (B) wherein (A) is (I) an ammonium orthophosphate, (II) a metal acid phosphate, or (III) at least (I) or (II) in combination with phosphoric acid; and (B) is a class of nitrogen-containing organic compounds typified by urea and compounds related thereto. Reactants (A) and (B) are mixed in proportions which provide a desired atomic ratio of nitrogen to phosphorus in the reaction mixture not greater than 5:1 and the reaction is continued until a desired atomic ratio of nitrogen to phosphorus is obtained in the condensed polyphosphate. In conformity with a modified aspect of the invention, a nitrogen-containing compound other than urea or urea-phosphate is reacted with (A) phosphoric acid alone or (B) a combination of phosphoric acid with ($B_1$) ammonium phosphates, ($B_2$) urea, ($B_3$) a urea-phosphoric acid adduct, or ($B_4$) a mixture of ($B_1$) to ($B_3$).

It is known that by heating diammoniumorthophosphate to a temperature above 100° C. a part of ammonia is split off so that monoammoniumorthophosphate is formed. This compound is decomposed above 200° C. while splitting off water and further ammonia to yield ammoniumpolyphosphate and free polyphosphoric acids. For this reason highly condensed ammoniumphosphates, which are free from phosphoric acids, hitherto have only been produced from phosphorus pentoxide or polyphosphoric acids and ammonia, i.e. from compounds from the molecules of which no water may be split off.

Ammoniumpyro- or -triphosphates may be produced either from the corresponding sodium salts via the barium or lead salts by double reaction or from the corresponding free polyphosphoric acids obtained with the acid of cation exchangers and which are neutralised with ammonia. Another method for the manufacture of condensed nitrogen-phosphoric acid-compounds is the reaction of phosphorus pentoxide with ammonia, preferably in the presence of water. Such methods may, however, only be practised with difficulty in a commercial scale according to Van Wazer, Phosphorus and its Compounds, volume 1, Chemistry, Interscience Publishers, New York, 1958, p. 841, last paragraph.

The reaction of ammonia salts with $P_2O_5$ or of urea with $P_2O_5$ or of urea with phosphoric acids, which have less water than orthophosphoric acid, or of urea with water-containing phosphoric acid for the manufacture of water-soluble or water-insoluble condensed nitrogen-phosphoric acid-compounds is also known.

By these known processes whose course of reaction may only be controlled with difficulty, nitrogen-phosphorus-compounds are obtained which may not be considered as uniform catenarily condensed ammoniumphosphates.

Mixed ammonium-metal-polyphosphates, i.e. condensed phosphates, are also known, the cation of which are partially ammonium and partially a mono-, di- or even at least trivalent metal, e.g. the sodium ammonium salts of di- or triphosphoric acid respectively. Thus, the mixed sodium - ammoniumpyrophosphate—

$$Na_2(NH_4)_2P_2O_7 \cdot 6H_2O$$

was prepared by the treatment of a $Na_2H_2P_2O_7$-solution with concentrated aqueous ammonia solution, while sodium-ammonium-triphosphates having varying ratios have been produced by removing various amounts of sodium from a $Na_5P_3O_{10}$-solution with an ion-exchanger and treating this acidic solution with ammonia.

The manufacture of potassium ammoniumpolyphosphates of higher degrees of condensation is also known. If $NH_4Cl$-solutions of at least such a content of $NH_4Cl$, that a precipitation of the phosphate is caused, act upon solutions of Kurrols salt of potassium for varying periods of time a number of "mixed salts" is obtained, ranging from the relatively pure amorphorus ammoniumpolyphosphate to a relatively pure amorphorus potassiumpolyphosphate. Mixed ammonium-metal-polyphosphates, such as $(NH_4)CrP_2O_7 \cdot 6H_2O$ have been produced by the precipitation of the corresponding metal salt solutions with a solution of an alkali metal of the corresponding phosphoric acid in the presence of ammonium ions.

A direct, thermal manufacture of such mixed ammonium-metal-polyphosphates is not yet known, since ammonia is split off below the temperature at which highly condensed phosphates are formed—about 450–600° C.

It has now surprisingly been found that according to the invention such catenarily condensed ammonium phosphates or ammonium-metal-phosphates are obtained in a simple manner. According to the invention (I) at least one ammoniumorthophosphate and/or (II) at least a metal phosphate, which still contains at least one acidic hydrogen atom, or (III) a mixture of components (I) and/or (II) with such an amount of phosphoric acid that at most 4, preferably at most 1.5 phosphorus atoms are present for each ammonium group or metal equivalent respectively, is reacted with at least one nitrogen-containing compound of the formulae

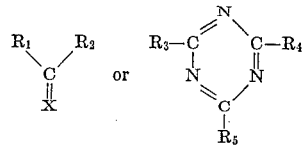

and/or at least an adduct of such compounds to orthophosphoric acid, if desired in the presence of water and/or water vapor, at a temperature above 110° C., the atomic ratio between nitrogen and phosphorus being in the starting mixture not greater than 5:1 and in the final product (a) not lower than 0.5:1 and preferably not lower than 1:1 where metal-free ammoniumpolyphosphates are produced and (b) —where the final product is an ammonium-metal-phosphate—not lower than 0.3:1 and the ratio between nitrogen and metal equivalents on the one hand to phosphorus on the other hand being at least 0.5:1. The preferred ratio from nitrogen to phosphorus is between 2:1 and 4.5:1 where metal-free ammonium-polyphosphates are to be produced.

In both formulae X is O, S or NH and $R_1$ is hydrogen, an alkyl, alkoxyl or amide radical having up to 3 carbon atoms or a $NH_2$—, $NH_2NH$— or

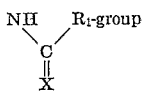

$R_2$ a $NH_2$—, $NH_4S$— or $NH_4O$-group, $R_3$, $R_4$ and $R_5$ an HO- or $NH_2$-group. [$R_1$ and X may also be combined to a nitrogen atom.] These compounds therefore are urea or compounds analogous, homologous or related thereto respectively.

The effect of the nitrogen-containing component is based on the fact that it is decomposed by the water which is set free upon heating acidic orthophosphates by intramolecular separation. This is shown for the reaction with formamide by the followig equation:

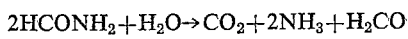

The ammonia thereby set free is partially or completely bound from the resulting condensed phosphates, so that the ammoniumpolyphosphates or mixed ammonium-metal-polyphosphates respectively, which usually cannot be prepared are formed. In this case it is of course possible to recover or circulate the gaseous reaction products set free, whereby the process becomes still more economical.

The nitrogen-containing organic compound is generally used in such an amount that per mol water, which may set free as a result of the formation of the polyphosphate, at least 0.3 gram atom of nitrogen is present, generally between 0.5 and 2.5. As a rule, when using small ratios, predominantly lower condensed polyphosphates are formed.

Suitable nitrogen-containing compounds are e.g. amides of mono-or polycarboxylic acids, such as formamide, oxamide, acetamide, biuret, semicarbazide, dicyandiamide, urea, thiourea, guanidine, urethanes, such as ethylurethane, cyanuric acid, melamine, ammeline or ammelide. A compound in which X and $R_1$ are combined to a single substituent is for example cyanamide.

The reaction may be carried out above 110° C. and for example up to 450° C. The temperature is dependent on the kind of the nitrogen-containing compound and the facility with which it is decomposed with the formation of ammonia. Thus the reaction proceeds especially smooth when using urea and/or urea phosphate, which is preferred, and generally is carried out between 110° C. and 350° C. and preferably between 130 and 250° C. When using other nitrogen-containing compounds a temperature of 180 to 400° C. is preferred.

It is also possible to introduce or to pass over respectively gaseous ammonia during the reaction or to treat acidic condensation products subsequently therewith at room temperature or preferably at elevated temperature. The reaction may be carried out at ordinary, elevated or reduced pressure or in a solvent which is inert towards the reactants, e.g. hydrocarbons. The starting mixtures may also be sprayed in a room having the temperature required for reaction. The period of heating may also be varied.

By variation of the starting mixtures and the reaction conditions, e.g. in the afore-said manner. it is also possible to vary the average degree of condensation of the final product. Thus polyphosphates having an average degree of condensation from 2 up to 1000 and more may be obtained, as it is desired, in which the nitrogen is practically completely bound as ammonium ion.

The products may, however, also contain minor amounts of orthophosphates.

It is an especial advantage of the invention that the hitherto difficulty accessible ammonium salts of the low-condensed phosphoric acids having 2 to 4 phosphorus atoms, above all the pyrophosphoric acid, may be obtained in a simple manner. For example by the selection of proper reaction conditions ammoniumpyrophosphates may almost selectively be produced. The formation of ammoniumpolyphosphates having a low degree of condensation is for example also favored by working in the presence of water or water vapor respectively and by reaction at a temperature up to 170° C. and furthermore by adjusting the ratio of ammonium groups and/or metal equivalents to phosphorus atoms in the starting mixture between 1:0.5 and 1:1.2.

According to a further modification catenarily condensed ammonium phosphates are also obtained, if the nitrogen-containing compounds of the said formulae—except of urea—are reacted—instead of with ammoniumorthophosphates—with (A) phosphoric acid or (B) mixtures of phosphoric acid with ($B_1$) ammonium phosphates, ($B_2$) urea, ($B_3$) a urea-phosphoric acid-adduct or ($B_4$) a mixture of at least two of components ($B_1$) to ($B_3$). The ratio between the nitrogen and the phosphorus contained in the reactants is in this case also at least 1:1. The compounds analogous and related to urea are here used in such an amount, that the ratio of the nitrogen to the phosphorus in the starting mixture is generally between 0.5:1 and 5:1, preferably between 0.8:1 and 3:1. If the ratio is lower than 1:1 gaseous ammonia advantageously is acted upon the product during or after the reaction.

The ammoniumpolyphosphates may be amorphous or crystalline. In spite of their $P_2O_5$-content which may be high (e.g. $(NH_4PO_3)_x$ contains about 72% $P_2O_5$) they are usually not hygroscopic. They are distinguished by their binding value of lime which is independent from the pH-value in a wide range, so that they are excellently suited for the water treatment. Although the reaction products of the invention contain as a rule at least one ammonium group per phosphorus atom, a part of the acid functions, namely up to 50%, may, however, also be present in free form. The pH-value of 1% aqueous solutions varies between 2 and 9 depending on the ammonia content and the degree of condensation of the single compounds. While the products having a low degree of condensation ($n$ up to about 10) are relatively soluble in water, those of an increased degree of condensation become more and more insoluble, though in a certain range with the aid of so-called "dissolving intermediaries," e.g. sodium- or potassium ions, or by raising the temperature of the solution aqueous solutions may be produced which are still limpid.

Suitable metal phosphates for carrying out the present process are primary and/or secondary metal salts of orthophosphoric acids. These may, if desired, also be reacted together with one or more ammoniumorthophosphates and/or phosphoric acid. Suitable phosphates are for example the phosphates of potassium, sodium, calcium, magnesium, strontium, barium, aluminum, iron, copper, manganese, cobalt, nickel, chromium, zinc, tin, lead, mercury. The tertiary or the basic phosphates of the single metals or metal-polyphosphates may of course also be used, if phosphoric acid and/or a urea-phosphoric acid-adduct is added to the starting mixture to adjust the desired ratio therein, i.e. the acidic metal phosphates then are reacted in the nascent state.

The present embodiment is therefore suitable for the manufacture of mixed ammonium-metal-polyphosphates having any desired ratio between ammonium and metal ions. If the portion of the metal phosphate added thereto is small, a modified ammoniumpolyphosphate is obtained, while a modified metal-polyphosphate is obtained, where the portion of the metal-phosphate is a great one. These two products may still contain free acid groups in an amount up to 50 equivalent percent. Within these limits all combinations may be obtained, the manufacture of compounds being preferred which contain one ammonium group for every 1 to 2 phosphorus atoms. The ratio of nitrogen to phosphorus in the starting substances is preferably between 0.8:1 and 1.5:1, while the ratio between metal equivalents and phosphorus generally is between 0.02:1 and 1.9:1 and preferably between 0.5:1 and 1:1. Ammonium- and metal ions are present in the final product preferably in a ratio of 1:3 to 3:1.

The ammonium-metal-phosphates are as a rule crystalline products, but they may also be obtained in the form of a glass. Their water solubility generally is reduced with a rising valency of the cation. Due to their variable water solubility and their binding power to lime and buffering capacity which may be very marked they may for example be used in the water treatment. Potassium ammoniumphosphates may for example be used for liquid fertilizers containing trace elements. The pH-value of 1% aqueous solutions may be between 4 and 9 dependent on the structure and degree of condensation, as a rule it is 6 to 8.

The process is illustrated by the following examples, the composition of the reaction product is shown by Table 2.

Example 1

(A) 26.4 g. of diammoniumorthophosphate were heated together with 12.0 g. of urea and 19.6 g. of crystallized orthophosphoric acid for 2 hours to 150° C. 45.7 g. of a crystalline reaction product were obtained.

(B) The reaction product was heated for further 2 hours to 110–120° C. while simultaneously conducting gaseous ammonia. This product was soluble at room temperature in water in a weight ratio of about 1:1. In principle it consisted predominantly of ammonium-pyrophosphate, the degree of condensation therefore was 2.

Example 2

23.0 g. of monoammoniumorthophosphate were heated together with 12.0 g. of urea for 1 hour to 200° C. 21.7 g. of a dry, non-hygroscopic crystalline reaction product were obtained. At room temperature 1 g. of this substance was soluble in 100 ml. of water compared with 5 g. at about 40° C.

If the said mixture was heated for 1 hour to 300° C., the degree of condensation was so high that only about 40% of the total $P_2O_5$-content of the reaction product were water-soluble at room temperature.

The binding values of lime which the products according to Examples 1A and 2 have at room temperature, are shown by the following Table 1:

TABLE 1

| pH | 4.0 | 5.0 | 6.0 | 7.0 | 8.0 | 9.0 |
|---|---|---|---|---|---|---|
| Binding value of lime in acc. to example 1A | 3.0 | 2.9 | 3.1 | 2.9 | 3.2 | |
| G. CaO/100 g. of phosphate acc. to example 2 | 14.5 | 14.5 | 14.5 | 14.5 | 14.5 | 14.5 |

Example 3

52.8 g. of diammoniumorthophosphate were refluxed together with 12.0 g. of urea in 500 ml. of mineral spirits (boiling point 155° C.) for 1 hour (period of heating up 35 minutes). After the reaction was finished 48 g. of a crystalline reaction product were sucked off, washed with acetone and dried in the air.

Example 4

6.6 g. of diammoniumorthophosphate and 7.9 g. of urea phosphate (molar ratio urea: $H_3PO_4=1:1$) were well mixed and heated in a pressure vessel (content 0.3 l.) for 3 hours to 150° C. 12 g. of a crystalline product were obtained.

Example 5

6.6 g. of diammoniumorthophosphate were heated together with 4.9 g. of crystallized orthophosphoric acid and 3.0 g. of urea in a tube furnace for 3 hours to 150° C. while simultaneously conducting gaseous ammonia. The yield was 11.5 g. of a crystalline product.

Example 6

23.0 g. of monoammoniumorthophosphate and 14.6 g. of urea were heated together for 1 hour to 300° C. 20 g. of a crystalline product were obtained.

Example 7

26.4 g. of diammoniumorthophosphate and 14.4 g. of urea were heated together for 1 hour to 320° C. The yield was 19 g. of a crystalline product.

Example 8

22.5 g. of formamide were heated together with 57.5 g. of monoammoniumorthophosphate for 17 hours to 200° C. 60 g. of a soft, amorphous reaction product were obtained.

Example 9

4.4 g. of oxamide were heated with 26.4 g. of diammoniumorthophosphate for 5 hours to 200° C. 23.4 g. of a partially glassy reaction product were obtained.

Example 10

11.8 g. of acetamide and 23 g. of monoammoniumorthophosphate were suspended in 400 g. of paraffinic oil and heated for 5 hours to 205° C. The reaction product was washed with mineral spirits and subsequently with acetone. Yield 20 g.

Example 11

8.4 g. of cyanamide were heated with 69.1 g. of monoammoniumorthophosphate for 1 hour to 300° C. The yield was 68 g. of a soft, amorphous product.

Example 12

15.2 g. of thiourea were heated together with 23 g. of monoammoniumorthophosphate for 1 hour to 300° C. 20 g. of a crystalline product were obtained.

Example 13

17.8 g. of ethylurethane were heated together with 23 g. of monoammoniumorthophosphate for 4 hours to 200° C. 20.8 g. of the reaction product were obtained.

Example 14

15.2 g. of ammoniumrhodanide and 47.4 g. of monoammoniumorthophosphate were heated for 2 hours to 200° C., obtaining 45.2 g. of the reaction product.

Example 15

8.6 g. of cyanuric acid were heated with 23 g. of monoammoniumorthophosphate for 1 hour to 400° C. 17.6 g. of a glassy product were obtained, in which 12.1% of the total $P_2O_5$-content were present as ammoniumtrimetaphosphate and were isolated, e.g. by fractionated precipitation or chromatography. The compound was well soluble in water and was not precipitated by heavy metal salts, so that it is suitable for the manufacture of special nutrient solutions which are used for the treatment of deficiency diseases of plants, such as chlorosis.

Example 16

6.3 g. of melamine were heated with 40.2 g. of diammoniumorthophosphate for 3 hours to 300° C. 33.3 g. of a partly crystalline, partly glassy product.

Example 17

39.2 g. of crystallised phosphoric acid were heated with 8.4 g. of dicyandiamide for 2 hours to 300° C. 38.5 g. of a crystalline reaction product were obtained.

Example 18

4.2 g. of melamine were heated together with 36.6 g. of phosphoric acid (80% $H_3PO_4$) for 1 hour to 300° C., whereby 30 g. of a glass-like product were obtained.

Example 19

12.2 g. of $NaH_2PO_4$, 11.5 g. of $NH_4H_2PO_4$ and 12 g. of urea were well ground together and heated for 1 hour to 200° C. The yield was 22.7 g. of a crystalline reaction product.

Example 20

12.2 g. of $NaH_2PO_4$, 13.2 g. of $(NH_4)_2HPO_4$ and 6 g. of urea were well ground together and heated for 1 hour to 180° C. The yield was 23.0 g. of a crystalline reaction product.

Example 21

14 g. of $KH_2PO_4$, 11.5 g. of $NH_4H_2PO_4$ and 12 g. of urea were well ground together and heated for one hour to 200° C. The yield was 21.9 g. of a crystalline reaction product.

Example 22

14 g. of $KH_2PO_4$, 23 g. of $NH_4H_2PO_4$ and 12 g. of urea were well ground together and heated for 1 hour to 180° C. The yield was 35.3 g. of a crystalline reaction product.

Example 23

26 g. of $Ca(H_2PO_4)_2 \cdot H_2O$ (54.55% $P_2O_5$, 19.33% CaO) and 6 g. of urea were heated for 1 hour to 160° C. The yield was 24.2 g. of a crystalline, difficultly soluble reaction product.

Example 24

13.5 g. of ferric phosphate (57.75% $P_2O_5$, 16.95% Fe) were well ground together with 7.9 g. of urea phosphate and 3 g. of urea and heated for one hour to 180° C. The yield was 20.2 g. of a crystalline, difficultly soluble reaction product.

Example 25

(A) 7 g. of $KH_2PO_4$, 11.5 g. of $NH_4H_2PO_4$ and 6 g. of urea were well ground together and heated for one hour to 170° C., ammonia being simultaneously introduced. The yield was 20 g. of a white crystalline foamy mass.

(B) If the same mixture was heated for one hour in paraffinic oil to 180° C. without introducing ammonia, a reaction product was obtained which was washed with mineral spirits and acetone and dried in the air. Yield 17 g.

Example 26

13 g. of $Ca(H_2PO_4)_2 \cdot H_2O$ were heated together with 4.9 g. of crystallized orthophosphoric acid and 6 g. of urea for 1 hour to 160° C. at a pressure of 60–70 mm. of mercury. 17 g. of a foamy, hygroscopic product were obtained.

Example 27

7 g. of $KH_2PO_4$, 11.5 g. of $NH_4H_2PO_4$ and 6 g. of urea were well ground together and heated for three hours in an autoclave of a volume of 0.3 l., i.e. under superatmospheric pressure, to 180° C. 19 g. of a white, crystalline, foamy product were obtained.

Example 28

26 g. of $Ca(H_2PO_4)_2 \cdot H_2O$ were heated together with 2.1 g. of dicyandiamide for 2 hours to 300° C. 21.3 g. of a product were obtained.

Example 29

14 g. of monopotassiumorthophosphate, 23 g. of monoammoniumorthophosphate and 13.2 g. of oxamide were heated for 2 hours to 300° C. Yield: 21 g.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

TABLE 2

| Example | Total N (percent) | $HH_3$–N (percent) | Total $P_2O_5$ (percent) | Ortho- | Di- | Tri- | oligo- (n=4–10) | Poly-phosphate (n>10) | Trimeta-phosphate | Metal oxide | pH of a 1% aqueous solution |
|---|---|---|---|---|---|---|---|---|---|---|---|
| 1A | 17.76 | 17.54 | 62.0 | 7.3 | 89.0 | 3.7 | | | | | 6.6 |
| 1B | 22.06 | 21.98 | 59.1 | 4.8 | 92.1 | 3.1 | | | | | 8.2 |
| 2 | 14.28 | 14.21 | 71.2 | | | | | 99.6 (n~80) | | | 5.5 |
| 3 | 18.9 | 18.4 | 58.9 | 17.0 | 69.1 | 10.0 | 3.9 | | | | |
| 4 | 21.9 | 21.6 | 57.6 | 6.0 | 88.0 | 6.0 | | | | | |
| 5 | 21.5 | 21.3 | 57.6 | 10.0 | 86.0 | 4.0 | | | | | |
| 6 | 14.9 | 14.1 | 70.8 | | | | | 99.5 | | | |
| 7 | 14.3 | 14.1 | 69.3 | | | | | 99.6 | | | |
| 8 | 11.9 | 11.3 | 69.1 | 16.0 | 34.1 | 23.6 | | 26.3 | | | |
| 9 | 14.1 | 13.3 | 63.5 | 5.6 | 48.6 | 26.0 | 19.8 | | | | |
| 10 | 11.0 | 10.6 | 68.0 | 11.5 | 39.2 | 26.5 | 22.8 | | | | |
| 11 | 11.8 | 10.8 | 68.6 | 10.7 | 23.5 | 16.5 | 13.0 | 36.3 | | | |
| 12 | 13.1 | 12.6 | 71.8 | 11.5 | 7.3 | 0.8 | | 80.4 | | | |
| 13 | 10.6 | 10.3 | 53.4 | 29.6 | 56.5 | 8.5 | 5.4 | | | | |
| 14 | 15.6 | 15.0 | 51.5 | 6.6 | 24.3 | 25.2 | 43.9 | | | | |
| 15 | 9.4 | 8.8 | 86.2 | 4.7 | 6.7 | 4.1 | 72.4 | | 12.1 | | |
| 16 | 13.0 | 12.6 | 73.4 | 2.6 | 5.3 | 4.6 | 9.5 | 77.5 | 0.5 | | |
| 17 | 13.0 | 11.6 | 69.6 | 3.1 | 7.5 | 11.0 | 9.3 | 69.1 | | | |
| 18 | 9.2 | 8.9 | 74.4 | 7.2 | 15.4 | 12.2 | 64.9 | | 0.3 | | |
| 19 | 9.7 | 8.3 | 65.5 | | 2.7 | 6.9 | 90.4 | | | 14.3 $Na_2O$ | |
| 20 | 11.1 | 10.9 | 61.5 | 12.2 | 49.6 | 26.0 | 12.2 | | | 13.0 $Na_2O$ | |
| 21 | 6.2 | 6.2 | 64.8 | 5.0 | 2.3 | 0.7 | 92.0 | | | 21.4 $K_2O$ | |
| 22 | 11.3 | 10.6 | 61.7 | 7.0 | 25.8 | 67.2 | | | | 13.3 $K_2O$ | |
| 23 | 8.6 | 7.8 | 57.4 | 4.5 | 30.2 | | 65.3 | | | 21.4 $CaO$ | |
| 24 | 10.2 | 9.4 | 58.9 | 5.5 | 23.3 | | 71.2 | | | 17.7 $Fe_2O_3$ | |
| 25A | 14.7 | 14.0 | 55.2 | 13.8 | 59.1 | 10.6 | 5.9 | 10.6 | | 12.7 $K_2O$ | |
| 25 | 9.5 | 9.2 | 59.6 | 13.6 | 31.0 | 14.0 | 5.0 | 36.4 | | 11.7 $K_2O$ | |
| 26 | 9.4 | 8.7 | 60.2 | 3.8 | 33.2 | 35.3 | | 27.7 | | 13.7 $CaO$ | 5.5 |
| 27 | 15.3 | 14.7 | 56.4 | 5.1 | 78.0 | 12.2 | 4.7 | | | 12.3 $K_2O$ | |
| 28 | 4.1 | 3.9 | 66.0 | 4.1 | 11.5 | 9.2 | 74.8 | | 0.4 | 24.6 $CaO$ | |
| 29 | 11.9 | 11.8 | 49.3 | 12.2 | 68.2 | 9.4 | [1] 10.2 | | | 10.9 $K_2O$ | |

[1] Tetraphosphate.

What is claimed is:

1. A process for the manufacture of catenarily condensed ammonium phosphates which comprises reacting at a temperature above 110° and below 450° C. (A) at least one member selected from the group consisting of (I) an ammoniumorthophosphate, (II) a mixture thereof with an amount of phosphoric acid such that at most four phosphorus atoms are present for each ammonium equivalent with (B) at least one nitrogen-containing compound delivering ammonia at said temperature and selected from the group consisting of compounds of the formulae

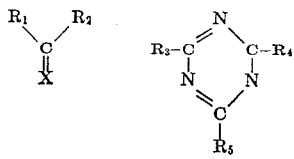

and adducts thereof to orthophosphoric acid, in which X as a separate substituent is selected from the group consisting of O, S and NH, $R_1$ as a separate substituent is selected from the group consisting of hydrogen, an alkyl group, an alkoxy group, an amide radical having up to 3 carbon atoms, an $NH_2$—, $NH_2$—NH—, and

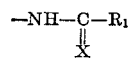

group, X and $R_1$ as a combined substituent constitute a trivalent nitrogen atom, $R_2$ is selected from the group consisting of $NH_2$—, $NH_4S$— and $NH_4O$— and any one of the radicals $R_3$, $R_4$ and $R_5$ is any one of the substituents of the groups consisting of OH and $NH_2$, the atomic ratio between nitrogen and phosphorus being in the starting mixture not greater than 5:1 and above 1:1 and the atomic ratio between nitrogen and phosphorus in the final product being not lower than 0.5:1, the nitrogen-containing organic compound being applied in the starting material in an amount such that for every mol of water which may be split off in the formation of polyphosphates at least 0.3 gram atom of nitrogen is present.

2. A process as claimed in claim 1, wherein a starting mixture is used, in which phosphoric acid is present at most in an amount such that at most 0.5 phosphorus atoms derived therefrom are present for every ammonium equivalent.

3. A process as claimed in claim 2 wherein metal-free ammonium polyphosphates are produced and the ratio between nitrogen and phosphorus in the starting mixture is between 2:1 and 4.5:1.

4. A process as claimed in claim 1, wherein from 0.5 to 2.5 gram atoms of nitrogen are present.

5. A process as claimed in claim 1, wherein the reaction is carried out at a temperature in the range from 110 to 350° C. and the nitrogen-containing compound is selected from the group consisting of urea, urea phosphate and mixtures thereof.

6. A process as claimed in claim 5, wherein the temperature is in the range from 130 to 250° C.

7. A process as claimed in claim 1, wherein the reaction is carried out at a temperature in the range from 180 to 400° C. and wherein the nitrogen-containing compound is different from urea and urea phosphate.

8. A process as claimed in claim 1, wherein the reaction is carried out in the presence of water vapor.

9. A process as claimed in claim 1, wherein gaseous ammonia is caused to act upon the mixture of reactants during the reaction.

10. A process as claimed in claim 1, wherein gaseous ammonia is caused to react upon the reacted mixture.

11. A process as claimed in claim 1, wherein the reaction is carried out at ordinary pressure.

12. A process as claimed in claim 1, wherein the reaction is carried out in a solvent which is inert towards the reactants.

13. A process as claimed in claim 1, wherein ammonium salts of pyrophosphoric acid are produced by reacting at a temperature below 170° C. a starting mixture in which the ratio from ammonia to phosphorus atoms is from 1:0.5 to 1:1.2.

14. A modification of the process as claimed in claim 1, wherein said nitrogen-containing compound is a compound other than urea and urea phosphate and is reacted with a compound selected from the group consisting of (A) phosphoric acid and (B) a mixture thereof with ($B_1$) an ammoniumorthophosphate ($B_2$) urea, ($B_3$) a urea-phosphoric acid adduct or ($B_4$) a mixture of at least two components ($B_1$) to ($B_3$) in which the phosphoric acid is present in an amount such that more than 4 phosphorus atoms are present for one equivalent selected from the group consisting of ammonium and a metal equivalent, the nitrogen-containing compound other than urea and urea phosphate being, however, present in an amount such that the atomic ratio between the nitrogen contained therein and the phosphorus contained in the starting mixture is from 0.5:1 to 5:1.

15. A process as claimed in claim 14, wherein the atomic ratio between nitrogen and phosphorus in the starting mixture is from 0.8:1 to 3:1.

16. A process as claimed in claim 14, wherein the atomic ratio from nitrogen to phosphorus in the starting material is smaller than 1:1 and wherein an amount of gaseous ammonia is caused to act upon the reactants during the reaction such that the atomic ratio between nitrogen and phosphorus is altogether at least 1:1.

17. A process as claimed in claim 1, in which the reaction is carried out by spraying.

18. A process for the manufacture of catenarily condensed phosphates in which the cation is a mixture of ammonium and at least one metal which comprises reacting at a temperature above 110° and below 450° C. (A) at least one member selected from the group consisting of (I) a metal phosphate which contains at least one acidic hydrogen atom, (II) a mixture thereof with an ammonium orthophosphate, (III) a mixture of at least one of the components (I) and (II) with an amount of phosphoric acid such that at most four phosphorus atoms are present for each cation equivalent contained in (I) and (II) with (B) at least one nitrogen-containing compound delivering ammonia at said temperature and selected from the group consisting of compounds of the formulae

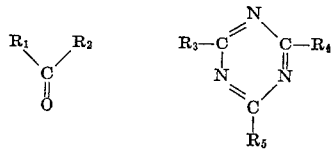

and adducts thereof to orthophosphoric acid, in which X as a separate substituent is selected from the group consisting of O, S and NH, $R_1$ as a separate substituent is selected from the group consisting of hydrogen, an alkyl group, an alkoxy group, an amide radical having up to 3 carbon atoms, an $NH_2$—, $NH_2$—NH—, and

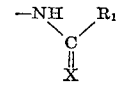

group, X and $R_1$ as a combined substituent constitute a trivalent nitrogen atom, $R_2$ is selected from the group consisting of $NH_2$—, $NH_4S$— and $NH_4O$— and any one of the radicals $R_3$, $R_4$ and $R_5$ is any one of the substituents of the groups consisting of OH and $NH_2$, the atomic ratio between nitrogen and phosphorus being in the starting mixture not greater than 5:1 and the atomic ratio between nitrogen and phosphorus in the final product being not lower than 0.3:1 and the ratio between nitrogen and metal equivalents on the one hand to phosphorus on the other hand in these latter products being at least 0.5:1, the nitrogen-containing organic compound being applied in the starting material in an amount such that for every mol of water which may be split off in the formation of polyphosphates at least 0.3 gram atom of nitrogen is present.

19. A process as claimed in claim 1 wherein a starting mixture is reacted which contains a metal phosphate and in which the atomic ratio from nitrogen to phosphorus is between 0.8:1 and 1.5:1 so as to produce ammonium metal phosphates.

20. A process as claimed in claim 1, wherein a starting mixture in which the ratio from metal equivalents to phosphorus atoms is in the range from 0.02:1 to 1.9:1 is reacted so as to produce an ammonium metal phosphate.

21. A process as claimed in claim 20, wherein the ratio is between 0.5:1 and 1:1.

22. A process as claimed in claim 18, wherein a starting mixture is used, in which phosphoric acid is present at most in an amount such that at most 0.5 phosphorus atoms derived therefrom are present for every cation equivalent present in the form of ammonium and metal.

23. A process as claimed in claim 18, wherein from 0.5 to 2.5 gram atoms of nitrogen are present.

24. A process as claimed in claim 18, wherein the reaction is carried out at a temperature in the range from 110 to 350° C. and the nitrogen-containing compound is selected from the group consisting of urea, urea phosphate and mixtures thereof.

25. A process as claimed in claim 24, wherein the temperature is in the range from 130 to 250° C.

26. A process as claimed in claim 18, wherein the reaction is carried out at a temperature in the range from 180 to 400° C. and wherein the nitrogen-containing compound is different from urea and urea phosphate.

27. A process as claimed in claim 18, wherein the reaction is carried out in the presence of water vapor.

28. A process as claimed in claim 18, wherein gaseous ammonia is caused to act upon the mixture of reactants during the reaction.

29. A process as claimed in claim 18, wherein gaseous ammonia is caused to react upon the reacted mixture.

30. A process as claimed in claim 18, wherein the reaction is carried out at ordinary pressure.

31. A process as claimed in claim 18, wherein the reaction is carried out in a solvent which is inert towards the reactants.

32. A process as claimed in claim 18, wherein salts of pyrophosphoric acid are produced by reacting at a temperature below 170° C. a starting mixture in which the ratio from the total amount of ammonia and metal equivalents to phosphorus atoms is from 1:0.5 to 1:1.2.

33. A process as claimed in claim 18, in which the reaction is carried out by spraying.

References Cited

UNITED STATES PATENTS

| | | | |
|---|---|---|---|
| 3,022,153 | 2/1962 | Miller | 71—29 |
| 3,241,946 | 3/1966 | Young | 71—43 |

OTHER REFERENCES

Van Wazer: Phosphorus and Its Compounds," vol. I, p. 685, Interscience Publishers, Inc., New York, London, 1958.

EARL C. THOMAS, *Primary Examiner.*

L.A. MARSH, *Assistant Examiner.*

UNITED STATES PATENT OFFICE
CERTIFICATE OF CORRECTION

Patent No. 3,419,349                  December 31, 196

Hans Adolf Rohlfs et al.

It is certified that error appears in the above identified patent and that said Letters Patent are hereby corrected as shown below:

Columns 7 and 8, TABLE 2, heading to the third column thereof, "HH$_3$-N" should read -- NH$_3$-N --; same table, eleventh column, opposite Example 23, "Ca$_2$O" should read -- CaO --. Column 9, lines 4 to 10, the right-hand formula should appear as shown below:

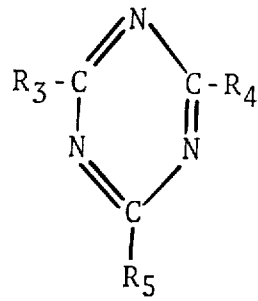

Column 10, lines 41 to 44, the left-hand formula should appear as shown below:

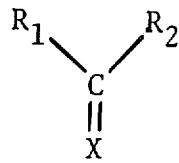

same column 10, line 73, and column 11, line 3, claim reference numeral "1", each occurrence, should read -- 18 --.

Signed and sealed this 24th day of March 1970.

(SEAL)
Attest:

EDWARD M. FLETCHER, JR.
Attesting Officer

WILLIAM E. SCHUYLER, JR.
Commissioner of Patents